May 3, 1966 G. TOOBY 3,249,446

METHOD FOR DRYING FOODS

Filed Aug. 10, 1964 2 Sheets-Sheet 1

INVENTOR.
GEORGE TOOBY
BY
ATTORNEYS.

May 3, 1966　　　　　　G. TOOBY　　　　　3,249,446
METHOD FOR DRYING FOODS
Filed Aug. 10, 1964　　　　　　　　　　　　2 Sheets-Sheet 2

INVENTOR.
GEORGE TOOBY
BY
Christie, Parker & Hale
ATTORNEYS 3,249,446
METHOD FOR DRYING FOODS
George Tooby, San Marino, Calif., assignor to Theo. Hamm Brewing Co., St. Paul, Minn., a corporation of Minnesota
Filed Aug. 10, 1964, Ser. No. 389,522
2 Claims. (Cl. 99—199)

This application is a continuation-in-part of my earlier filed application bearing Serial No. 144,815, and filed on October 11, 1961, entitled "Method and Apparatus for Drying," now abandoned, and which application is a continuation of my earlier filed application bearing Serial No. 776,023, and filed on November 24, 1958, entitled "Method and Apparatus for Drying," now abandoned.

This invention relates to a method for drying at ultra-high frequencies and, more particularly, to a method for quickly producing a natural colored, dried, palatable food product having a long shelf life without deteriorating.

Many drying processes are slow and wasteful of space because of the difficulty in supplying the heat of vaporization of the natural fluids or juices within the material. In ordinary oven drying, the drying progresses from the outer surfaces inward and the energy required to evaporate the moisture on the inside must be conducted through the outer portion. It has been found that when discrete pieces or chunks of materials to be dried, such as fruit, vegetables, or meat, are dried by conventional hot air processes, the final dried product has an outer shell which is hardened more than the rest of the product, and the product as a whole is wrinkled, shrunken, and tough. Also, materials and food products dried in this manner rehydrate very slowly and incompletely.

With the advent of radio frequency heating apparatus, a means of generating heat uniformly throughout a non-conducting mass was provided, and its use resulted in the rapid and uniform drying of many materials. Investigations in radio frequency heating included the dehydration of pharmaceutical products, foods, and even the cooking of foods. These investigations indicated that in the preparing of food pieces bad electrical effects including burning resulted when the process was carried out at the conventional radio frequencies. Accordingly, developmental work was conducted to determine the optimum frequency relationships for transferring the heat energy to the food particles being processed. One such investigation is reported in "Electronics" for October 1947, in an article entitled "UHF Heating of Frozen Foods," appearing on pages 85–89.

In general, these electronic methods for processing materials, and foods in particular, require large power so as to preclude the ready acceptance of these techniques in the home, but the commercial applications of these techniques for restaurants, bakeries, food processing industries, and the like, appear to be quite attractive.

This invention provides a novel and improved method and apparatus for drying or desiccating food pieces or chunks on a substantially large order allowing it to be employed in commercial applications. The carrying out of the invention results in an improved palatable, dried product which retains its natural color, is of a low density, and even an improved puffed or expanded product may be produced. The foods to be dried are preferably prepared in pieces or chunks of bite size, and which solid foods may be fruit, vegetables, meat and the like having a natural fluid or juice therein responsive to the application of heat; i.e., heat-sensitive foods.

The drying method comprises subjecting the food pieces to electromagnetic radiation in the microwave region to supply the heat of vaporization of the natural fluids or juices therein so as to evaporate them from within the food pieces. During the time the food pieces are exposed to the electromagnetic radiation, they are also subjected to a heated, dry fluid arranged so as to carry away the fluids or vapors expelled from the surface of the food pieces. This process is controlled so that the food pieces are not only free of burns or any other deleterious electrical effects, but also the outer surface is prevented from drying faster than the remainder of the particle, thereby avoiding the formation of a hard outer shell. The temperature of the fluid for conveying the expelled vapors away from the food pieces can be controllably reduced after a preselected drying interval to maintain a maximum rate of drying consistent with optimum product quality. This temperature change is a function of the moisture content of the food pieces which, while exposed to electromagnetic radiation, can most readily be measured by the power absorbed by the food pieces. If a puffed product is desired, the electromagnetic radiation is increased, evaporating the water within the piece at a higher rate than it can diffuse to the surface so as to expand the food piece and which expanded shape will be retained after the drying procedure is completed. While following the procedure to obtain a puffed product, and during the final phase of the drying period, a short, high burst of energy is applied to the food piece to assure puffing.

This novel process is carried out by means of drying apparatus comprising a drying cabinet having a metallic casing including electrically conducting perforated walls within the casing for defining an electromagnetic cavity therein. The cavity defined in this fashion is provided with a plurality of low loss dielectric trays or shelves supported in the cavity, and which shelves are adapted to receive the food pieces to be dried. The trays are also perforated in the same fashion as the cavity walls. An ultra-high frequency generator for generating electromagnetic radiation, preferably of 1000 megacycles, is associated with the drying cabinet. The ultra-high frequency generator is coupled to the cavity so as to permeate the cavity completely with the electromagnetic radiation. Means are also provided for introducing a heated, dry fluid, such as the ambient air, into the drying cabinet to carry away expelled fluids and vapors. Means are also provided for exhausting this vapor laden fluid from the drying cabinet through the cavity, the casing being arranged and constructed to provide a passage for the conveying fluid therebetween and the perforations or holes in the walls of the cavity and in the trays provide the means of communication between this passage and the cavity.

The product resulting from this drying method is a final product having each food piece dried throughout to substantially the same low moisture content, producing thereby a food product which may be stored for a long time without deterioration. The dried food product will retain its natural color and have a low density, and as well may have a puffed appearance.

These and other features of the present invention may be more fully appreciated when considered in the light of the following specification and drawings, in which.

Figure 1:
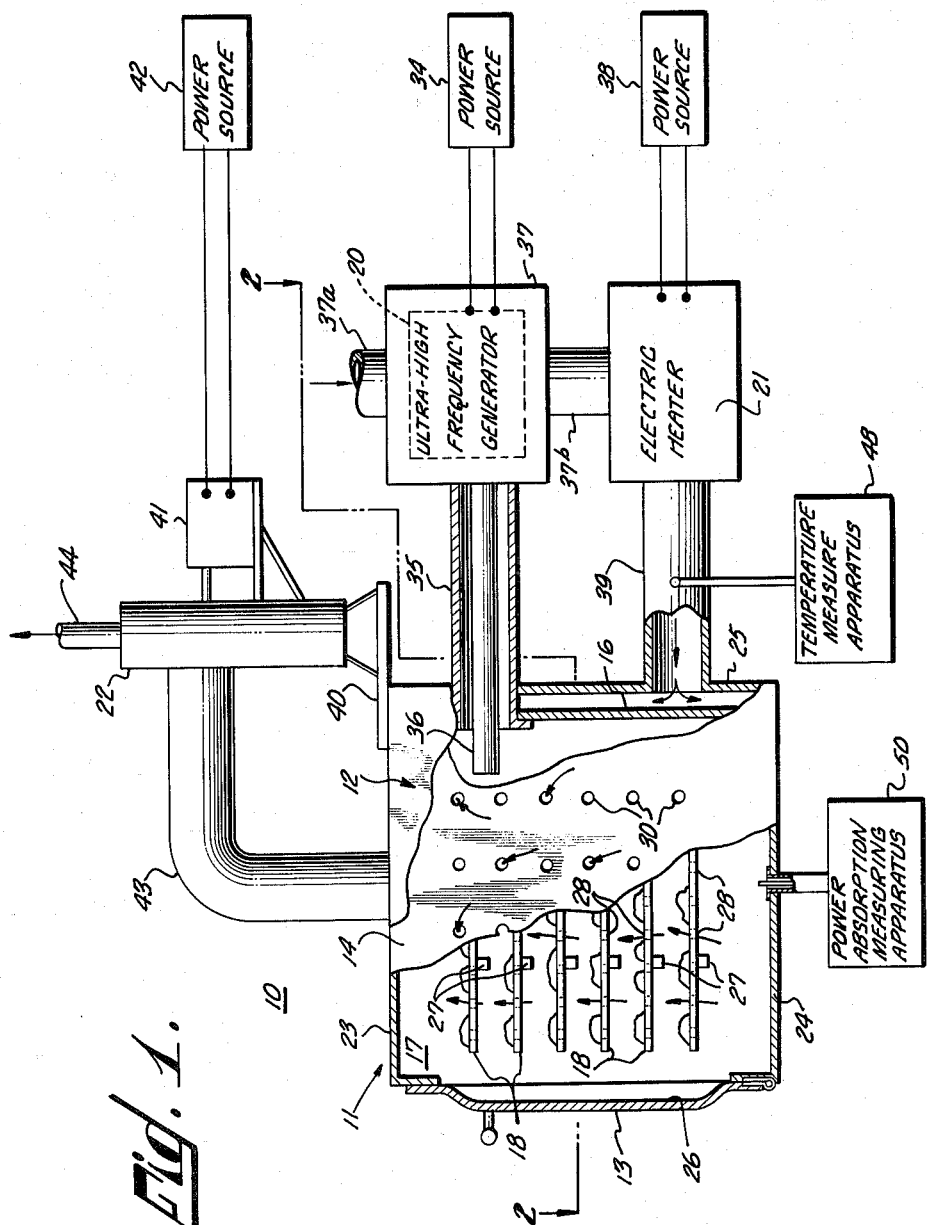
FIGURE 1 is an elevational view with portions broken away to show the interior of the drying apparatus and embodying the invention.
Figure 2:
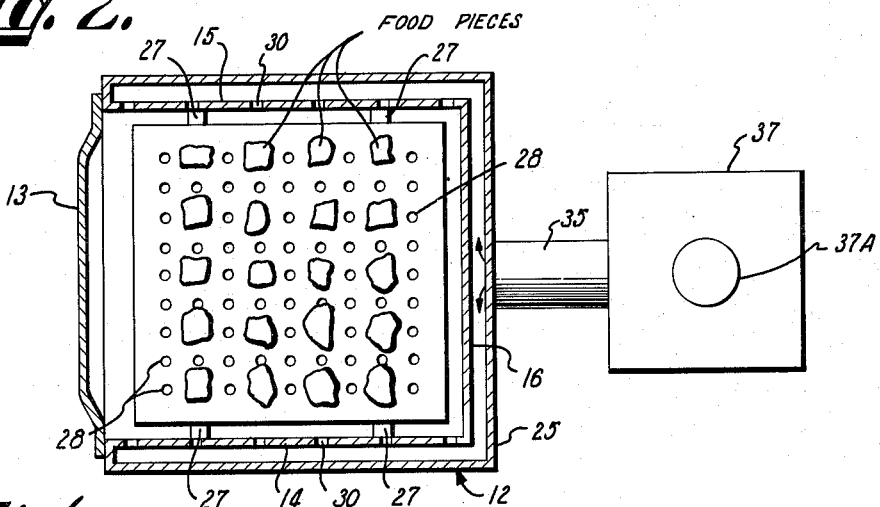
FIGURE 2 is a cross-sectional view taken along the line 2—2 of FIG. 1.

Now referring to the drawings, the apparatus for carrying out the drying method will be explained. The drying apparatus 10 comprises a drying cabinet 11, including a metallic casing 12 having a cooperating door 13 and spaced walls 14, 15, and 16 to define an electromagnetic cavity 17 therein. The cavity 17 is arranged to support a plurality of drying shelves or trays 18. An ultra-high frequency generator 20 is provided to produce the electromagnetic radiation for the cavity 17. A heating means 21 is also provided to heat a vapor conveying fluid to be introduced into the drying cabinet 11, as well as exhausting means 22 for removing this fluid from the drying cabinet.

The drying cabinet 11 is a hollow, thin-walled metallic casing 12 comprising the top and bottom walls 23 and 24, respectively, and a back wall 25. The front of the casing 12 is enclosed by a cooperating door 13, hinged to the bottom wall 24. The door 13 is hinged to open outwardly from the position shown in FIG. 1 to thereby allow the drying trays 18, food pieces or both to be placed within the drying cabinet 11. The metallic casing 12 includes the cavity walls 14–16 spaced inwardly of the walls 23–25 to define a plenum passage for a fluid passing between these walls. The cavity walls 14–16 including the inner wall 26 for the door 13 are further arranged and constructed to define the electromagnetic cavity 17 for the drying cabinet 11. The cavity walls 14–16 are provided with a plurality of tray supporting members 27, vertically spaced therein and horizontally aligned to receive and support the drying trays 18. The drying trays 18 may be adapted to be slidable on the supports 27 so as to extend outwardly of the door 13 or to be removed entirely to facilitate the placing of the food pieces thereon, as in conventional domestic heating appliances. The drying trays 18 may be constructed of a low loss dielectric material or material of high dielectric value such as polyethylene. The drying trays 18, however, preferably are constructed of a small mesh screen of such materal. These drying trays 18 are provided with a plurality of perforations or holes 28 arranged to allow the vapor conveying fluid within the cavity walls 14–16 to be exhausted upwardly from tray to tray. To this end, the cavity walls 14 and 15 are also provided with perforations 30 and which latter perforations are arranged relative to the drying trays 18 in horizontal alignment above the trays 18 to pass the vapor conveying fluid over the surface of the food pieces undergoing drying. The size of the cavity wall perforations 30 is preferably arranged to be small enough to block the passage of the electromagnetic waves while allowing the passage of a fluid therethrough. These perforations may be dimensioned relative to the wall thickness to present a short circuit to the electromagnetic radiation by any conventional microwave technique.

Associated with the drying cabinet 11 is the ultra-high frequency generator (UHF) 20. The UHF generator 20 is connected to a suitable source of power 34 and capable of producing considerable alternating current power at a frequency on the order of 1000 megacycles. The generator 20 is connected through a coaxial line or wave guide 35 to the drying cabinet 11 and includes a suitable coupling such as a probe 36 projecting through the rear cavity wall 16 into the cavity 17 proper. In this fashion, the alternating voltage of the generator 20 is transmitted by means of the antenna or probe 36 into the cavity 17, whereby centimeter electromagnetic waves are produced in the cavity 17 and which waves comprise electric and magnetic fields permeating completely the space in the cavity 17.

The heat generated by the UHF generator 20 is utilized in accordance with this invention to preheat the vapor conveying fluid to be passed into the drying cabinet 11. To this end the UHF generator 20 is shown enclosed in a fluid duct 37 having a fluid inlet portion 37ᵃ to receive the atmospheric or ambient air. The air circulating in the duct 37 acts to cool the UHF generator 20 and thereby is preheated. An outlet portion 37ᵇ for the duct 37 conveys the preheated fluid from the generator 20 to the heating means 21, wherein it is heated to its final drying cabinet temperature. The heating means 21 may comprise a conventional electric heater, such as a resistance wire heater, connected to a suitable source of power, shown by the block identified by the reference character 38. The fluid received at the heating means 21 is conveyed into the drying cabinet 11 by means of a conduit 39 communicating with the heating means 21 and the drying cabinet 11. The conduit 39 is connected to the bottom portion of the cabinet 11 through the metallic casing 12 to pass the air into the plenum chamber provided between the spaced walls of casing 12.

The exhaust means 22 for the drying apparatus 10 is supported on a platform 40, suitably connected to the top of the drying cabinet 11. The exhaust means 22 may be a conventional fan powered by a separate motor 41, also connected to a separate power source 42. The exhaust means 22 is utilized to exhaust the fluid or air from the drying cabinet 11 and more particularly the cavity 17 therein. The exhaust fan is arranged within the housing for exhaust means 22 so as to cooperate with an exhausting duct 43 communictaing with the top of the drying cabinet 11 and extending through the top wall 23. The exhaust duct 43 in this fashion will convey the fluid from the drying cabinet 11 into the exhaust means 22, from which the fluid will pass out through the exhaust duct 44.

With the power source 42 connected to the fan for the exhaust means 22 and the power source 38 connected to the heating means 21, the path of the fluid through the drying apparatus 10 may now be traced. The fluid will enter the duct 37 by means of the inlet duct 37ᵃ, be passed around the generator 20, then through the duct 37ᵇ into the heating means 21. The thus heated fluid will pass from the heater 21 into duct 39 and then into the drying cabinet 11. The fluid will be conveyed into the plenum chamber formed by the walls of the metallic casing 12 and will then travel by means of the cavity wall perforations 30 into the cavity 17 itself. With the exhaust means 22 operative at this time the pressure within the cavity 17 will have been reduced so as to draw this heated air into the cavity 17 by means of the cavity wall perforations 30 to uniformly distribute the fluid over the food pieces. As described hereinabove, these cavity wall perforations 30 are arranged so as to cause the fluid passing therethrough to pass over the food pieces placed on the storage areas of the drying trays 18. Also, the fluid will be exhausted upwardly through the cavity 17 by means of the tray perforations 28. The fluid then will pass from the cabinet 11 through the conduit 43 and be exhausted by means of the exhaust conduit 44 from the drying apparatus 10.

Figure 3:
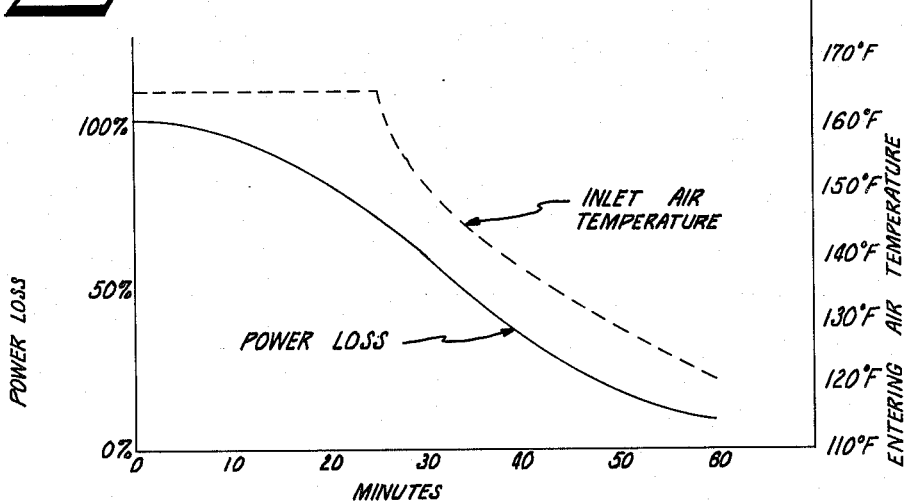
FIGURE 3 is a graphical representation of power loss and conveying fluid temperature during the drying cycle.

Sensing means such as the temperature measuring apparatus 48 for controlling the temperature of the vapor conveying fluid passed into the drying cabinet 11 may be provided to automatically control the temperature of the fluid. When manual control of the fluid temperature is desired, the apparatus 48 may be in the form of a thermometer which may be inserted into the conduit 39 to measure the temperature of the fluid therein. Also, since this temperature control is dependent upon the power absorbed by the food pieces being dried, the power delivered to the cavity 17 should also be observed by the operator of the drying apparatus 10. This observation may be made by the provision of power absorption measuring apparatus 50 in the form of a meter suitably connected to the driving cabinet 11 as the probe 36 or any other well known manner. The desired temperature relationship and power loss for the drying cabinet 11 can be better appreciated by examining FIG. 3. The operator, upon observing the power loss and the temperature of the vapor conveying fluid and correlating this information with a chart similar to that of FIG. 3 for the food being dried, can adjust the heating means to decrease the fluid temperature. By way of example the drying temperature in applications of the type to be described hereinafter may be maintained at a temperature of 165 degrees Fahrenheit until the power absorbed in the cavity 17 has reached a point of approximately 75 percent. After this initial drying interval, the operator should adjust the electric heating means 21 to gradually reduce the power delivered thereto from the power source 38 so as to in turn gradually reduce the temperature of the fluid conveyed to the drying cabinet 11. This fluid temperature is gradually reduced until the point where the power absorbed in the cavity 17 is approximately 10 percent, at which time the fluid temperature should be 120 degrees Fahrenheit.

Having described the apparatus for drying the food pieces, the method will now be described more fully. The material or food pieces to be dried are first blanched, cleaned, and diced or divided into small pieces or chunks of preferably bite size. The pieces should be large enough to be discrete pieces but small enough so that the electromagnetic waves will completely penetrate them and heat them uniformly throughout. Such pieces of food may have their smallest dimension as much as two inches and can be of any convenient shape. It will also be appreciated that the thickness of the food pieces is such that they will not be completely dried through in a very short time. The food pieces prepared in this fashion may then be placed on the drying trays 18 and in the instance where the trays 18 are removable from the drying cabinet 11 the trays 18 are placed into the cabinet 11. The cabinet door 13 is then closed and the drying operation may then be started by the operator. The exhaust means 22 is then powered from the power source 42. The heating means 21 is also powered from its associated power source 38, and the UHF generator 20 is also started. It should be noted at this point that it is desirable to match the impedance of the generator 20 with that of the loaded cavity, and this may be accomplished by a suitable transformer and indicator as described in the above identified "Electronics" publication.

After the UHF generator 20 has been energized, it will be effective to transmit the electromagnetic radiation to the drying cabinet 11 by means of the coaxial line 35 and the antenna or probe 36. The electromagnetic radiation will completely permeate the cavity 17 so that the heat sensitive food pieces therein are heated entirely through at once so as to expel the natural fluids diffusing through the food pieces. As the fluids are expelled from the surface of the food pieces, the heated fluid entering the cavity will be passed over the food pieces and which heated fluid will absorb the fluids and fluid vapors from the food pieces at about the same rate it is expelled from the food pieces and carry it out of the cavity 17 as a result of the cooperating action of the exhausting means 22. This coaction of the electromagnetic radiation and the heated fluid is so controlled in accordance with this invention to allow the food pieces to dry completely and uniformly throughout without any hardening of the outer surface of the food pieces. Also, the electromagnetic radiation at the preferred 1000 megacycle frequency will not result in the burning or heating of the food pieces so as to make them undesirable or unpalatable.

The superior product resulting from this drying operation will be a bite size food product having a natural color and of low density. The food product prepared in this rapid fashion is dried to a low fluid content and may be stored for future use without deteriorating.

If it is desired to produce a product that is puffed or expanded with its attendant commercial advantages, it may be accomplished in accordance with the procedure of this invention by increasing the electromagnetic radiation delivered to the cavity 17 to cause the heat sensitive food pieces to expel the fluids therefrom at such a rate that the food pieces will expand. In other words, the rate of evaporation within the food pieces is greater than the rate of diffusion of the fluid vapor outward through them to result in the increased volume of the pieces. In following this puffing procedure, to assure that a puffed product results, a short, high level burst of energy has been found necessary. Specifically, when the operator observes that the moisture level of the food product has reached 20 to 25 percent of its original level through the observation of the power loss characteristic, the operator raises the input power level to the chamber to its full value for approximately 30 seconds and then turns the power level back down again to complete the drying period in accordance with the characteristics illustrated in FIG. 3. An expanded or puffed food product prepared in this fashion will retain its puffed appearance after the drying operation is completed.

It should be noted that an important feature of this invention is that it is not necessary to provide an external source of steam to the food to be dried for expanding the food. In conventional drying methods the steam is required to provide the internal pressure for expanding or puffing the food prior to the drying thereof.

When it is desired to produce a dried fruit piece for a breakfast food, a drying cycle of about one hour may be employed. In a conventional present day commercial drying apparatus the same fruit piece would require a 24-hour drying cycle. This one-hour drying cycle results when the fluid is passed through the cavity 17 at a rate of approximately 600 feet per minute to dry fruit pieces having a size of 5/8 inch x 5/8 inch x 5/8 inch and having an initial fluid content of about 85 percent. The food pieces can be quickly dried by this invention to about 14 percent moisture to produce sweet, unwrinkled, stable fruit pieces suitable for a breakfast food.

It will be recognized by those skilled in the drying art that variations and modifications may be made within the scope of this invention. Some of these changes may include changes in the shape of the cavity, automatic programming of the fluid temperature for the drying cabinet by sensing the power loss of the UHF generator and programming the fluid temperature as a function of such power loss, such fluid temperature being changed by varying the power delivered to the electrical heating means. Furthermore, the humidity of this fluid and the fluid velocity relative to the power delivered to the cavity may be controlled. Also, such a method is compatible for drying food pieces batchwise or adaptable for a continuous process.

What is claimed is:

1. A method of drying foods including subjecting a solid food piece to ultra-high frequency radiation to provide the heat of vaporization for the natural fluids of the food piece for causing the fluids to diffuse from the inner portions thereof outwardly through the outer surface of the food piece, the food piece having preselected dimensions relative to the frequency of the radiation to allow the radiation to completely penetrate it and heat it uniformly throughout over a period of time, simultaneously passing a dry gas heated to an initial temperature over the surface of the food piece to carry away the fluids diffusing through the food piece, the initial temperature of the gas being selected to absorb the expelled fluids at approximately the same rate they are expelled from the food piece whereby the food piece is free of burns and other deleterious electrical effects and the outer surface of said food piece is prevented from drying faster than the remainder of the food piece, sensing and observing the rate of absorption of the ultra-high frequency energy by the food piece undergoing drying, maintaining the initial temperature of the gas until the observed energy absorption decreases to a preselected amount, and gradually reducing the initial temperature of the gas in accordance with the decrease of the energy absorption with time over a preselected time interval to uniformly dry the food piece throughout.

2. A method of drying solid foods as defined in claim 1, including the steps of momentarily applying a short, high power level burst of energy to the food piece during the portion of the drying period the power loss characteristic is approximately 20–25 percent.

References Cited by the Examiner

UNITED STATES PATENTS 2,419,875  4/1947  Birdseye.
2,705,679  4/1955  Griffiths et al. _____ 99—207
2,953,457  9/1960  Sanna.

A. LOUIS MONACELL, Primary Examiner.

HYMAN LORD, Examiner.